(12) United States Patent
Brady

(10) Patent No.: US 8,226,336 B2
(45) Date of Patent: Jul. 24, 2012

(54) SYSTEMS AND METHODS FOR MATERIAL INTERFACE DETECTION DURING DRILLING OPERATIONS

(75) Inventor: Steven K. Brady, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1218 days.

(21) Appl. No.: 11/942,376

(22) Filed: Nov. 19, 2007

(65) Prior Publication Data

US 2009/0129877 A1    May 21, 2009

(51) Int. Cl.
*B23B 39/08* (2006.01)
(52) U.S. Cl. .............................. 408/1 R; 408/9; 408/12
(58) Field of Classification Search .................. 408/8, 9, 408/12, 224, 1 R; *B23B 39/08*
See application file for complete search history.

(56) References Cited

U.S. PATENT DOCUMENTS

| | | | |
|---|---|---|---|
| 3,821,921 A * | 7/1974 | Rosenberg | 409/80 |
| 3,995,969 A * | 12/1976 | Fleming | 408/12 |
| 4,198,180 A | 4/1980 | Schultz | |
| 4,688,970 A * | 8/1987 | Eckman | 408/9 |
| 4,745,557 A | 5/1988 | Pekar et al. | |
| 4,807,587 A * | 2/1989 | Baetschmann et al. | 125/1 |
| 4,822,215 A * | 4/1989 | Alexander | 408/9 |
| 4,854,786 A | 8/1989 | Alexander et al. | |
| 4,881,858 A * | 11/1989 | Volk et al. | 409/218 |
| 5,022,798 A * | 6/1991 | Eckman | 408/1 R |
| 5,116,168 A | 5/1992 | Aihara | |
| 5,613,810 A * | 3/1997 | Bureller | 408/3 |
| 5,677,515 A * | 10/1997 | Selk et al. | 174/255 |
| 5,802,937 A * | 9/1998 | Day et al. | 82/1.11 |
| 6,665,948 B1 * | 12/2003 | Kozin et al. | 33/833 |
| 6,964,546 B1 * | 11/2005 | Vakil | 408/110 |
| 7,096,555 B2 * | 8/2006 | Tourne et al. | 29/402.06 |
| 7,351,018 B2 * | 4/2008 | Oden et al. | 409/131 |
| 2001/0047219 A1 * | 11/2001 | Oden | 700/159 |

\* cited by examiner

*Primary Examiner* — Eric A Gates
(74) *Attorney, Agent, or Firm* — Armstrong Teasdale LLP

(57) ABSTRACT

Systems and methods for detecting a material interface between two dissimilar materials in intimate contact with one another include a detection circuit to detect the interface via changes in electrical conditions in the circuit during a drilling operation.

19 Claims, 3 Drawing Sheets

SYSTEMS AND METHODS FOR MATERIAL INTERFACE DETECTION DURING DRILLING OPERATIONS

BACKGROUND OF THE DISCLOSURE

This disclosure relates generally to fabrication systems and methods for assembling structures using a combination of composite materials and structural metal material, and more specifically to drilling systems and methods for preparing composite material and substrate materials for assembly.

The structural performance advantages of composites, such as carbon fiber epoxy and graphite bismaleimide (BMI) materials, are widely known in the aerospace industry. Aircraft designers have been attracted to composites because of their superior stiffness, strength, and radar absorbing capabilities, for example. As more advanced materials and a wider variety of material forms have become available, aerospace usage of composites has increased.

When using fasteners to attach composite skins to metal substrates, coaxial holes must be drilled in both the skin and an underlying metal substrate. In some cases "interference-fit" fasteners are used requiring the coaxial holes to be of different diameters in each of the skin and the substrate. Conventionally, this necessitates separation of skin and substrate during drilling so that separate drilling operations can be carried out on each. The skin and substrate are subsequently assembled to one another and joined with the fastener.

In other cases, the hole diameter may be the same in each material, but because the skin and substrate may require different drill speed and feed rates, efficient drilling of the holes remains elusive.

BRIEF DESCRIPTION OF THE DISCLOSURE

Consistent with illustrative embodiments disclosed, an embodiment of a system for detecting an interface between first and second materials having dissimilar electrical characteristics and in intimate contact with one another is disclosed. The system comprises a drilling machine having a drill bit for drilling a hole through each of the first and second materials without separating the first and second materials. An electrical circuit is completed through the drill bit and includes each of the first and second materials. Electrical conditions in the circuit are responsive to changing electrical characteristics of the circuit as the drill bit is advanced into each of the first and second materials. A monitoring element is associated with the electrical circuit and, based upon the changes in the electrical circuit, is adapted to detect an interface between the first and second materials.

Optionally, the monitoring element may comprise a computer. The monitoring element may also comprise a display. The monitoring element may record changes in the electrical circuit over time as the hole is drilled, and may identify the location of the interface by the presence of abrupt changes in the electrical circuit. One of the first and second materials may be a carbon fiber reinforced composite material. The other of the first and second materials may be a structural metal material. The first and second materials may have different electrical resistance, with the first material having a higher electrical resistance than the second material, wherein the current flowing through the circuit gradually changes as the drill bit is advanced into the first material toward the second material, and wherein the current flowing through the circuit abruptly changes when the drill bit contacts the second material, and the abrupt change in the current flowing in the circuit corresponds to the interface between the first and second materials.

The electrical circuit may include a DC power supply. The circuit may include a wire brush establishing a circuit connection to the drill bit. The first and second materials may be joined with a fastener having an external diameter, with the drill bit comprising a probe bit having a smaller diameter than the external diameter. The fastener may require different diameter holes to be drilled in each of the first and second materials. The drill bit may comprise a first bit section having a first diameter and a second drill bit section having a second diameter, wherein the second diameter is smaller than the first diameter. The drill bit may comprise one bit section corresponding to the first required hole in the first material and another bit section corresponding to the second required hole in the second material, wherein the first and second required holes may be formed in a single drilling operation.

Another embodiment of a system for detecting an interface between first and second materials having dissimilar electrical characteristics is disclosed. The first and second materials are maintained in intimate contact with one another, with the first material comprising a carbon fiber reinforced composite material and the second material comprising a structural metal. The system comprises a drilling machine having a drill bit for drilling a hole through each of the first and second materials without separating the first and second materials. An electrical circuit is completed through the drill bit and through each of the first and second materials. The circuit includes a detection element responsive to changing electrical characteristics of the circuit as the drill bit is advanced sequentially into each of the first and second materials, wherein the electrical characteristics include at least one of resistance, capacitance and inductance. A computer receives a signal output of the monitoring element and monitors the signal output to detect the interface between the first and second materials.

Optionally, the signal output of the monitoring element is gradually changed as the drill bit advances through the first material, and abruptly changes as the drill bit contacts the second material. The abrupt change in the signal output corresponds to the interface between the first and second materials. The drill bit may be configured to drill holes of more than one size. The monitoring element may be a current to voltage converter, and the electrical circuit may be a DC circuit.

Also disclosed is an embodiment of a method of drilling at least one hole through first and second materials having different electrical properties while the first and second materials are maintained in intimate electrical contact with one another during a drilling operation. The method utilizes a system including a drilling machine and an electrical detection circuit, and the method comprises: connecting a first terminal of a detecting circuit to the drill bit; connecting a second terminal of the detecting circuit to one of the first and second materials, thereby completing the electrical circuit through the drill bit and the first and second materials; energizing the circuit; advancing a drill bit having a first diameter of the drilling machine into the first material; and monitoring an electrical characteristic of the circuit to detect an interface between the first material and the second material.

Optionally, the method further comprises operating the drilling machine to drill through the first material at a first rotational speed and feed rate for the drill bit; adjusting a rotational speed and feed rate of the drilling machine to second rotational speed and feed rate as the drill bit approaches or first contacts the interface; and operating the drilling machine at the second rotational speed and feed rate to drill through the second material.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE DISCLOSURE

Advantageous embodiments of systems and methods for detecting material interfaces during drilling operations are disclosed herein that greatly facilitate an assembly of a structure having dissimilar materials in a reduced amount of time. Additionally, damage to the materials during drilling operations is minimized, or altogether avoided.

Figure 1:
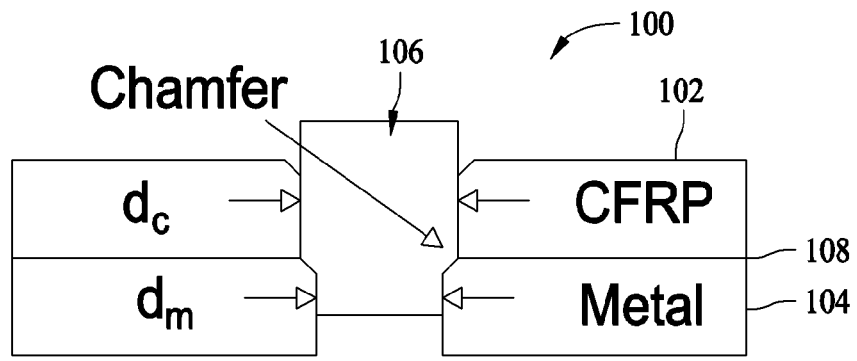
FIG. 1 illustrates a portion of an assembly including a composite material skin being coupled to a structural metal substrate with a fastener.

FIG. 1 illustrates an exemplary assembly 100 that may be used to construct a larger structure, for example, of an aircraft or other vehicle. The assembly 100 may include a composite material 102, such as a carbon fiber reinforced resin material known in the aerospace industry, and a structural metal substrate material 104 that are arranged in a stacked or layered orientation. The structural metal substrate 104, may, for example, be titanium, aluminum, steel or another structural metal. The substrate 104 may be used to erect a skeleton or frame, with the composite material 102 attached to and covering the frame. For this reason the composite material 102 is sometimes referred to as a skin. While the materials 102 and 104 are illustrated as substantially flat and planar elements, they may be shaped, contoured, or curved into virtually any shape desired.

The composite material 102 and the metal substrate 104 have different physical attributes and properties, and exhibit different behavior in use. Attaching the composite material 102 to the metal substrate therefore, can be challenging. For example, the materials 102 and 104 may be joined to one another with a fastener 106 that requires different diameter holes to be drilled in each respective material. In the example shown in FIG. 1, the hole in the composite material 102 at the location of the fastener 106 is drilled to a first diameter $d_c$, and the hole in the metal substrate material 102 at the location of the fastener 106 is drilled to a second diameter $d_m$. As seen in FIG. 1, $d_c$ is greater than $d_m$. One end of the fastener 106 has an interfering relationship with the diameter $d_m$ in the metal substrate 104, and another end of the fastener 106 has a clearance fit in the diameter $d_c$ of the composite material 102.

Because of the different diameters $d_c$ and $d_m$ needed for the holes in each of the composite material 102 and the metal substrate 104, the composite material 102 and the substrate material 104 have been conventionally separated so that the diameters $d_c$ and $d_m$ are drilled separately in each material 102 and 104, typically with a drilling machine. Separate handling of the composite material 102 from the substrate 104, however, is undesirable, and it would be beneficial to avoid separate drilling of the materials 102 and 104 to reduce unnecessary handling of the materials 102 and 104 during assembly that could subject the materials to damage, and ultimately to reduce assembly times for manufacturing the assembly 100 and the larger structure of which it is a part. Especially for relatively large structures having many fasteners 106 distributed over the structure, such as in the fabrication of an aircraft, avoiding separate drilling of the holes in each of the composite material 102 and the substrate material 104 may result in appreciable reductions in production times and reduction in costs of fabricating the aircraft.

Drilling the holes needed in the materials 102 and 104 without separating them, however, presents several challenges. Different drill rotation and feed rates may be necessary to drill satisfactory holes in each of the composite material 102 and the substrate material 104. If the wrong drill speeds or feed rates are used for either material, ruined drill bits, ruined materials or even ruined drilling machines, may result. As each of the composite material 102 and the substrate material 104 require different drill speeds and feed rates, drilling the hole diameters $d_c$ and $d_m$ without separating the materials becomes difficult, especially near the interface 108 between the two materials 102 and 104. Operating a drill bit at an acceptable speed for the carbon material 102 will not be acceptable when the interface is 108 is crossed and the drill is advanced into the metal substrate 104, so transitioning the drill speed and feed rate from a speed and feed rate appropriate for the composite material 102 to an acceptable drill speed and feed rate for the metal substrate 104 as the drill bit approaches the metal substrate is needed. This is necessary for drilling single diameter holes as well as holes of different diameter in each material.

Detection, and if desired the precise location, of the interface 108 therefore becomes important to efficient drilling operations, but to date has been difficult to reliably establish so that the drill can be optimally adjusted to drill through each material 102 and 104 in a single and efficient drilling operation without separating the materials 102 and 104. In particular, the accurate detection of the material interface 108 is important to minimize drilling time spent at lower rotation and feed rates so that more holes can be drilled in a given amount of time, and also to avoid damage to drill bits.

Embodiments of systems and methods are advantageously provided to precisely detect, and optionally locate, the material interface 108 between the composite material 102 and the metal substrate 104 to facilitate drilling operations to from the holes with diameters $d_c$ and $d_m$ without having to separate the materials 102 and 104 from one another. That is, the hole diameters $d_c$ and $d_m$ may be formed while the materials 102 and 104 are clamped together or otherwise held in an intimate, face to face or surface to surface contact.

As will be described, the systems and methods for detecting the material interface 108 incorporate electrical equipment and circuitry, plus interpretation methods for data to accurately identify the position, relative to a drilling machine, of the interface 108 between two materials of dissimilar electrical characteristics (e.g., the composite material 102 and the metal substrate 104) when in the circuit. The circuitry includes the composite material 102 and the metal substrate 104. That is, a circuit path is completed through the stacked or layered materials 102 and 104 that are intimate contact with one another. The differing electrical properties and characteristics of each material 102 and 104, as will become apparent below, result in changes to electrical conditions in the electrical circuitry. By monitoring the changes in electrical conditions in the circuitry, the interface 108 between the two materials 102 and 104 may be detected, and if desired its location may be determined.

The different electrical properties and characteristics of the composite material 102 and the metal substrate 104 affect the conditions in the circuit as drilling progresses sequentially through the composite material 102 and the metal substrate material 104. Different electrical properties between the materials 102 and 104 that influence the circuit include electrical resistance, inductance characteristics, and capacitance characteristics as drilling operations proceed through each material while they are clamped together or otherwise maintained in surface contact with one another during drilling operations. Notably, and unlike known material interface detection schemes for drilling, the systems and methods do not utilize detection of changes in the mechanical resistance to the drill's rotation or feed, but rather rely on electrical changes resulting from the assembly 100 being in the circuit as drilling operations proceed.

Figure 2:
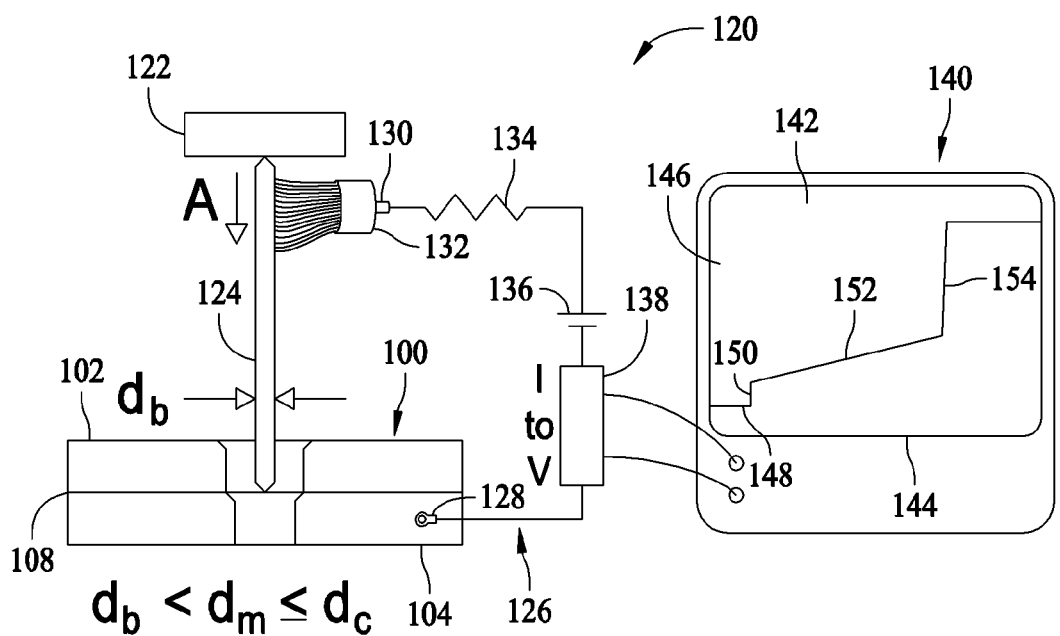
FIG. 2 schematically illustrates a material interface detection system for the assembly shown in FIG. 1.

Referring now to FIG. 2, an exemplary material interface detection system 120 is shown. The system 120 includes a known drilling machine 122 that includes a drill bit 124 that is operable at a selected speed and feed rate to advance the drill bit in the direction of arrow A toward the assembly 100 to drill fastener holes therein. An electrical detection circuit 126 is connected to the assembly 100, and specifically to the metal substrate 104 with a first terminal end 128 of a first wire, and to the drill bit 124 at a second terminal end 130 of a second wire. Electrical connection may be established to the metal substrate 104 and the drill bit 124 via any known attachment method, including but not limited to a terminal clamped to the metal substrate 104 and a wire brush 132 establishing mechanical and electrical contact with the drill bit 124. In the example illustrated in FIG. 2, the circuit 126 further includes a resistor 134, a power supply 136 that may be a direct current (DC) power supply such as a battery, and a current to voltage converter element 138. In further and/or alternative embodiments, the circuit 126 may include other components as desired.

A monitoring element 140 is associated with the electrical detection circuit 126, and in the embodiment shown in FIG. 1, the monitoring element may be a computer 140 having a display 142, a recording oscilloscope, or another device capable of monitoring the circuit 126 as explained further below to detect and/or determine the location of the material interface 108 in the assembly 100. In the exemplary embodiment shown in FIG. 1, the current to voltage converter 138 senses current flowing in the detection circuit 126 during a drilling operation, and an output of the current to voltage converter 138 is input to the monitoring element 140, using any appropriate analog to digital converters and the like to provide a signal that is recognized by the monitoring element 140. The system 120 monitors changes in the circuit over time as the drill bit 124 is advanced into the assembly 100 to detect the material interface 108 between the composite material 102 and the metal substrate 104.

Specifically, when the circuit 126 is energized and the drill bit 124 is brought into physical contact with the composite material 102, the circuit 126 is completed and current flows from the power source 136 through the resistor 134 to the drill bit 124 via the wire brush 132. The current flows through the drill bit 124 to the composite material 102, and because the composite material 102 and the metal substrate 104 are in intimate contact with one another, the current flows through the composite material 102 to the metal substrate 104. From the metal substrate 104, the current flows back toward the power supply 136 and is sensed by the current to voltage converter element 138.

Electrical changes in the circuit 126 are illustrated on the display 142 shown in FIG. 2. In the display 142 as shown, an elapsed time corresponds to the horizontal or x axis 144 and the sensed voltage output of the current to voltage converter element 138 is plotted on the vertical or y axis 146. That is, the voltage output of the current to voltage converter element 138 is plotted over time and is used to detect and determine the location of the material interface 108 in the assembly 100. The differing electrical properties of the composite material 102 and the metal substrate 104 cause voltage changes in the output of the current to voltage converter element 138 during different portions of the drilling operation, and the voltage changes facilitate detection of the material interface 108 as explained below.

As shown in FIG. 2, the voltage output from the current to voltage converter 138 is zero for a first period of time, represented by the portion 148 of the voltage plot on the display 142. The portion 148 represents a period of time in which the drill bit 124 is descended toward the composite material 102, but has not yet physically contacted the material 102.

When the drill bit 124 contacts the upper surface of the composite material 102, the circuit is completed and current begins to flow. This corresponds to a sharp rise in the output voltage of the current to voltage converter element 138 as represented by the portion 150 in the display 142.

As the drill bit 124 drills through the composite material, the effective electrical resistance of the assembly 100 gradually decreases, and the current flowing in the circuit 126 gradually increases. This portion of the drilling operation is represented by the portion 152 in the display 142.

When the drill bit 124 physically touches the metal substrate 104 having a much lower electrical resistance than the composite material 102, the current flowing in the circuit dramatically and abruptly increases. The corresponding output voltage of the current to voltage converter element 138 is represented by the portion 154 in the display 142 shown in FIG. 2. The sharply rising current represented by the portion 154 in the display 142 corresponds to the detection of the material interface 108, and the physical location of the interface 108 in the assembly 100 can be determined, manually or automatically, using signal output corresponding to the portion 154 in a number of ways.

For example, when the drill bit 124 is advanced by the drilling machine 122 into the composite material 102 at a known feed rate, the span of the portion 152 along the x axis 144 marks an elapsed time that the drill bit 124 contacts the composite material 102. Multiplying the feed rate by the elapsed time of the portion 152 yields the distance traveled by the tip of the drill bit 124 through the composite material 102, which is equal to the distance of the material interface 108 from the uppers surface of the composite material 102. By calculating the location of the material interface 108 in such a manner, the distance can be input to the control of the drilling machine 102 and used as a reference point to optimally adjust the speed and feed rate of the drill at or near the point of the material interface 108. Such a determination method would not actually require a display 142 to implement, but rather the monitoring element 140 need only evaluate the timing between sharp increases in the signal outputs to determine the location of the material interface 108.

As another example, simply the detection of the dramatic and abrupt rise in the current when the drill bit 124 contacts the metal substrate 104 could be used to signal the need to adjust the speed and feed rate of the drilling machine 102.

As still another example, when the drilling machine 122 utilizes a position encoder to locate the drill bit 124 relative to the assembly 100, the precise position wherein the portion 154 of the display 142 occurs marks the location of the material interface 108. This position can be flagged and stored for future use by the machine to optimally adjust the speed and feed rate of the drill at or near the point of the material interface 108. The position encoder could similarly be used to locate the upper surface of the composite material 102. The locations of the upper surface of the composite material 102 and the material interface 108 may then be used to control the drilling machine 122 by appropriately adjusting, for example, the drill speed and the feed rate as the bit approaches the material interface 108. Like the foregoing example of determining the location of the interface, such a determination method would not actually require a display 142 to implement as the position encoder of the machine 122 reveals the location of the interface when the dramatic voltage increase occurs that corresponds to portion 154 as shown in FIG. 2.

As yet another example, an oscilloscope-type display 142 similar to that shown in FIG. 2 could be presented to an operator of the drilling machine 122. By watching the display 142 in real time, the operator could note the portion 154 of the graph and either computing or inferring the location of the material interface 108, and accordingly use it as a baseline to control the drilling machine 122 and the location of the drill bit 124.

While in the example above the circuit 126 is monitored via the current to voltage converter element 138, the circuit could be monitored at another location or via another component if desired. For example, the voltage across the resistor 134 could be directly input to the monitoring element 140. As another example, another electrical property could be monitored and input to the monitoring element 140, such as a direct measurement of current, as opposed to voltage, at a specified location in the circuit 126.

Using any of the above circuit monitoring techniques for detecting the material interface 108, and also for determining the location of the material interface 108 if desired, the drill bit 124 may be drilled through both the composite material 102 and the metal substrate 104 to create coaxial holes of equal diameter without separating the materials from one another. In the example illustrated in FIG. 2, the drill bit has a diameter $d_b$ that is smaller than either the diameters $d_m$ and $d_c$ of the metal substrate 104 and the composite material 102, respectively. Such a bit 124 is sometimes referred to as a "pilot" bit used to make an initial hole into which other drill bits may be used to enlarge the hole to the appropriate diameters $d_m$ and $d_c$.

Figure 3:
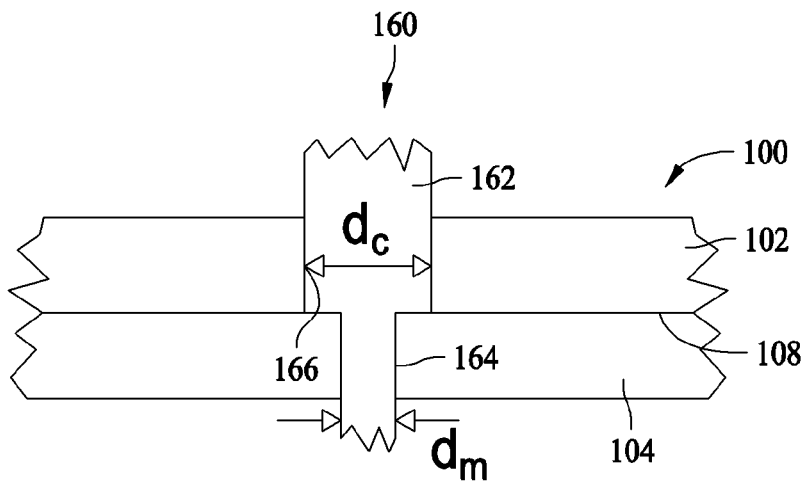
FIG. 3 illustrates an alternative drill bit for the system shown in FIG. 1.

Alternatively, a drill bit such as the bit 160 shown in FIG. 3 may be used that has discrete sections of a different diameter, such as a first section 162 having the diameter $d_c$ and a second section 164 having the diameter $d_m$. The bit 160 may be advanced into and through the assembly 100 (FIGS. 1 and 2) so that a ledge 166 separating the two bit sections 162 and 164 is inserted approximately to the depth of the material interface 108 but not beyond the material interface 108. The holes in the composite material 102 and the metal substrate may then be drilled to the respective diameters $d_m$ and $d_c$ in a single drilling operation with the same bit 160. Additional sections of the bit could likewise be provided to drill still other holes of different diameter if desired in the materials 102 and 104, or in additional layers of materials without having to separate them.

Figure 4:
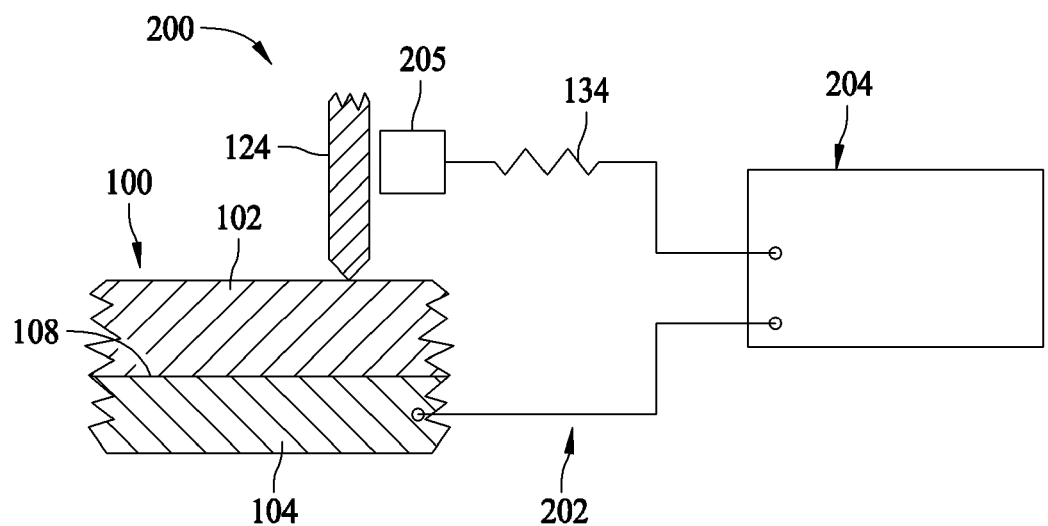
FIG. 4 illustrates a second embodiment of a material interface detection system for the assembly shown in FIG. 1.

FIG. 4 illustrates another embodiment of a material interface detection system 200 for a drilling operation that provides similar advantages to the system 120 described above. The system 200 includes a detection circuit 202 that, unlike the circuit 126 in the system 120, is an alternating current (AC) circuit. The circuit 202 is connected to a monitoring element 204 in the form of a computer, an LRC meter, or a network analyzer. The monitoring element 204 provides an AC signal input to the circuit 202 and collects the return signal from the circuit. The coupling 205 to the drill bit 124 may be a physical contact element such as a wire brush, an inductive (non-contact) coupling such as a coil around the bit 124, a capacitive (non-contact) coupling such as a plate near the drill bit 124 or another coupling. Like the circuit 126 in the system 120, the circuit 202 is completed through the drill bit 124 when the bit contacts the assembly 120. The monitoring element 204 may monitor inductance L or capacitance C values in the return signal, and by detecting changes in the L or C values, the interface may be detected and its location may be determined or deduced with appropriate algorithms and may be used to control the drilling machine.

Figure 5:
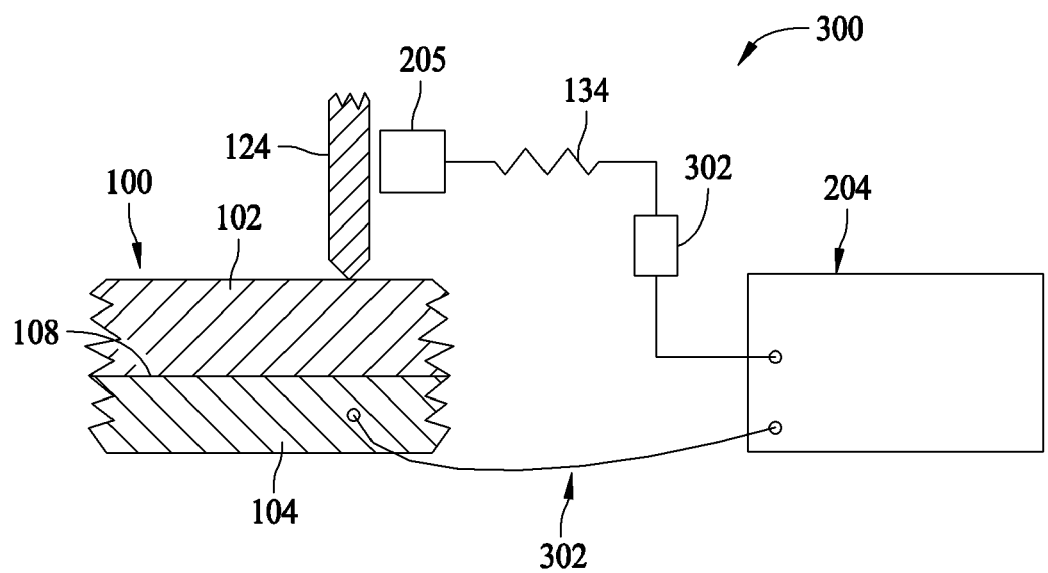
FIG. 5 illustrates a third embodiment of a material interface detection assembly for the assembly shown in FIG. 1.

FIG. 5 illustrates another detection system 300 with a circuit similar to the circuit 202 shown in FIG. 4 but including another component 302 such as a capacitor or inductor connected in series with the resistor 134. In such an embodiment, the drill bit 124 and the assembly 100, together with the component 302 effectively provide an LRC resonant circuit 302 that can be monitored with the monitoring element 204. The resonant frequency of the circuit 302 can then be monitored to detect the material interface 108 and also to determine or deduce the location of the material interface 108 by monitoring changes in the resonant frequency of the circuit 302.

Figure 6:
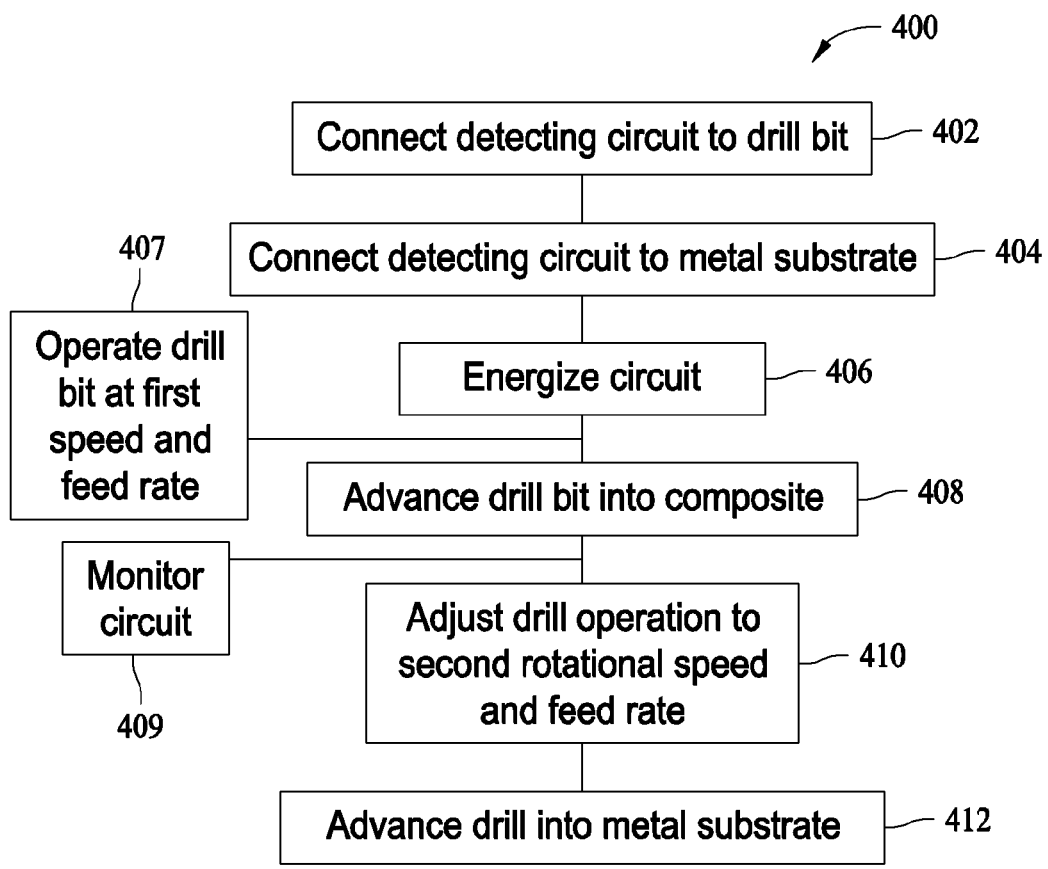
FIG. 6 illustrates a method of detecting a material interface.

FIG. 6 illustrates a method 400 of drilling at least one hole through first and second materials having different electrical properties while the first and second materials are maintained in intimate electrical contact with one another during a drilling operation, such as the assembly 100. The method utilizes a system including a drilling machine and an electrical detection circuit, such as any of the systems 120, 200 and 300 or their equivalents. The method comprises connecting 402 a first terminal of a detecting circuit to the drill bit of the machine, and connecting 404 a second terminal of the detecting circuit to the metal substrate in the assembly 100, thereby completing the electrical circuit through the drill bit and the first and second materials. The circuit may be any of the circuits 126, 202 and 302 described above. The method also includes energizing 406 the circuit with an AC or DC signal, operating 407 the drill bit at a first rotational speed and feed rate, and advancing 408 the drill bit into the first material, and monitoring 409 an electrical characteristic of the circuit to detect an interface between the first material and the second material, and optionally to determine the location of the interface. The electrical characteristic may be current, voltage, capacitance, inductance or another characteristic that changes as the drill advances through the material assembly 100. The method 400 also includes adjusting 410 a rotational speed and feed rate of the drilling machine to a second rotational speed and feed rate as the drill bit approaches the interface, and advancing 412 the drill bit at the second rotational speed and feed rate to drill through the second material.

The described systems and methods advantageously facilitate drilling of holes through layers of dissimilar materials without separating the materials and separately drilling holes therein. The described systems and methods also remove the need to slow drilling speeds and feed rates prior to the drill bit contacting the metal substrate, as may be necessary when no interface detection or interface sensing system and method are employed. Holes having equal diameters and different diameters may be drilled in the respective dissimilar materials effectively, efficiently, and reliably. The systems and methods may be implemented at relatively low cost, and greatly reduce production time to drill a large number of holes to attach composite materials to a metal substrate frame of an aircraft.

While the systems and methods have been described in terms of various specific embodiments, those skilled in the art will recognize that they can be practiced with modification within the spirit and scope of the claims.

What is claimed is:

1. A system for detecting an interface between first and second materials having dissimilar electrical characteristics and in intimate contact with one another, the system comprising:
   a drilling machine having a drill bit for drilling a hole through a portion of each of the first and second materials without separating the first and second materials, the portion of each of the first and second materials not including a hole prior to the drilling;
   an electrical circuit completed through the drill bit and including each of the first and second materials, wherein electrical conditions in the circuit are responsive to changing electrical characteristics of the circuit as the drill bit is advanced into each of the first and second materials; and
   a monitoring element associated with the electrical circuit and, based upon the changes in the electrical circuit, adapted to detect an interface between the first and second materials; and
   wherein the drilling machine is configured to:
      drill through the first material at a first rotational speed and feed rate for the drill bit;
      enable a rotational speed and feed rate of the drilling machine to be adjusted to a second rotational speed and feed rate as the drill bit approaches the interface; and
      drill through the second material at the second rotational speed and feed rate.

2. The system of claim 1, wherein the monitoring element comprises a computer.

3. The system of claim 1, wherein the monitoring element comprises a display.

4. The system of claim 1, wherein the monitoring element records changes in the electrical circuit over time as the hole is drilled, and identifies the location of the interface by the presence of abrupt changes in the electrical circuit.

5. The system of claim 1, wherein one of the first and second materials is a carbon fiber reinforced composite material.

6. The system of claim 5, wherein the other of the first and second materials is structural metal material.

7. The system of claim 1, wherein the first and second materials have different electrical resistance, the first material having a higher electrical resistance than the second material, wherein the current flowing through the circuit gradually changes as the drill bit is advanced into the first material toward the second material, and wherein the current flowing through the circuit abruptly changes when the drill bit contacts the second material, the abrupt change in the current flowing in the circuit corresponding to the interface between the first and second materials.

8. The system of claim 1, wherein the electrical circuit includes a DC power supply.

9. The system of claim 1, wherein the circuit includes a wire brush establishing a circuit connection to the drill bit.

10. The system of claim 1, wherein the first and second materials are to be joined with a fastener having an external diameter, the drill bit comprising a probe bit having a smaller diameter than the external diameter.

11. The system of claim 1, wherein the first and second materials are to be joined with a fastener having an external diameter, and wherein the fastener requires different diameter holes to be drilled in each of the first and second materials.

12. The system of claim 1, wherein the first and second materials are to be joined with a fastener having an external diameter, the drill bit comprising a first bit section having a first diameter and a second drill bit section having a second diameter, wherein the second diameter is smaller than the first diameter.

13. The system of claim 1, wherein the fastener requires different diameter holes to be drilled in each of the first and second materials, the drill bit comprising one bit section corresponding to the first required hole in the first material and another bit section corresponding to the second required hole in the second material, wherein the first and second required holes may be formed in a single drilling operation.

14. A system for detecting an interface between first and second materials having dissimilar electrical characteristics, the first and second materials being maintained in intimate contact with one another, the first material comprising a carbon fiber reinforced composite material and the second material comprising a structural metal, the system comprising:
   a drilling machine having a drill bit for drilling a hole through a portion of each of the first and second materials without separating the first and second materials, the portion of each of the first and second materials not including a hole prior to the drilling;
   an electrical circuit completed through the drill bit and through each of the first and second materials, the circuit including a detection element responsive to changing electrical characteristics of the circuit as the drill bit is advanced sequentially into each of the first and second materials, wherein the electrical characteristics include at least one of resistance, capacitance and inductance; and
   a computer receiving a signal output of the monitoring element, the computer monitoring the signal output to detect interface between the first and second materials; and
   wherein the drilling machine is configured to:
      drill through the first material at a first rotational speed and feed rate for the drill bit;
      enable a rotational speed and feed rate of the drilling machine to be adjusted to a second rotational speed and feed rate as the drill bit approaches the interface; and
      drill through the second material at the second rotational speed and feed rate.

15. The system of claim 14, wherein the signal output of the monitoring element is gradually changed as the drill bit advances through the first material, and abruptly changes as the drill bit contacts or comes very near to the second material, the abrupt change in the signal output corresponding to the interface between the first and second materials.

16. The system of claim 14, wherein the drill bit is configured to drill holes of more than one size.

17. The system of claim 14, wherein the monitoring element is a current to voltage converter.

18. The system of claim 14, wherein the electrical circuit is a DC circuit.

19. A method of drilling at least one hole through first and second materials having different electrical properties while the first and second materials are maintained in intimate electrical contact with one another during a drilling operation, the method utilizing a system including a drilling machine and an electrical detection circuit, the method comprising:
- connecting a first terminal of a detecting circuit to the drill bit;
- connecting a second terminal of the detecting circuit to one of the first and second materials, thereby completing the electrical circuit through the drill bit and the first and second materials;
- energizing the circuit;
- advancing a drill bit having a first diameter of the drilling machine into a portion of the first material, the portion of the first material not including a hole prior to advancing the drill bit into the portion of the first material;
- monitoring an electrical characteristic of the circuit to detect an interface between the first material and the second material;
- operating the drilling machine to drill through the first material at a first rotational speed and feed rate for the drill bit;
- adjusting a rotational speed and feed rate of the drilling machine to second rotational speed and feed rate as the drill bit approaches the interface; and
- operating the drilling machine at the second rotational speed and feed rate to drill through the second material.

* * * * *